Dec. 23, 1947.　　　B. J. ZIEGLER　　　2,433,013
MEANS FOR FORMING LENSES
Filed Dec. 28, 1942　　　4 Sheets-Sheet 1
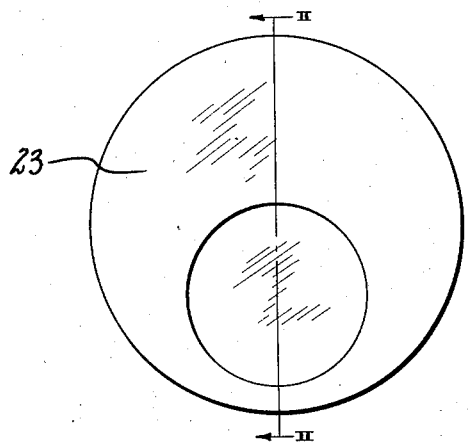
Fig. I
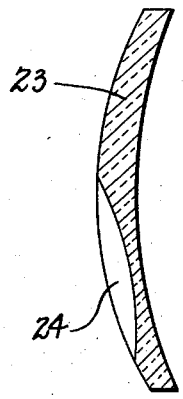
Fig. II
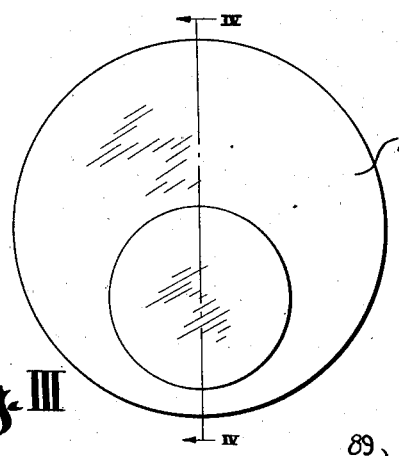
Fig. III
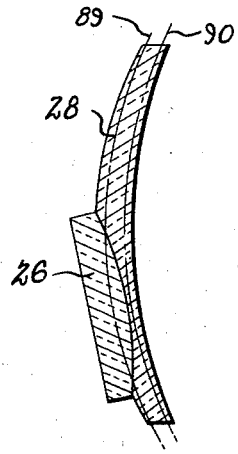
Fig. IV
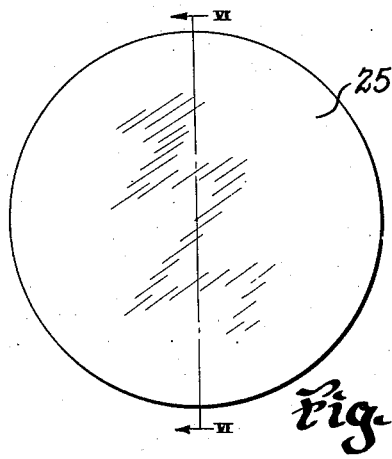
Fig. V
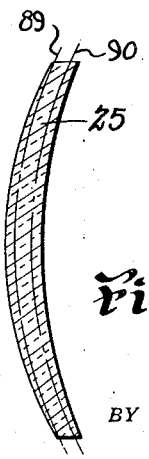
Fig. VI
INVENTOR.
BYRON J. ZIEGLER
BY Louis L. Gagnon
ATTORNEY.

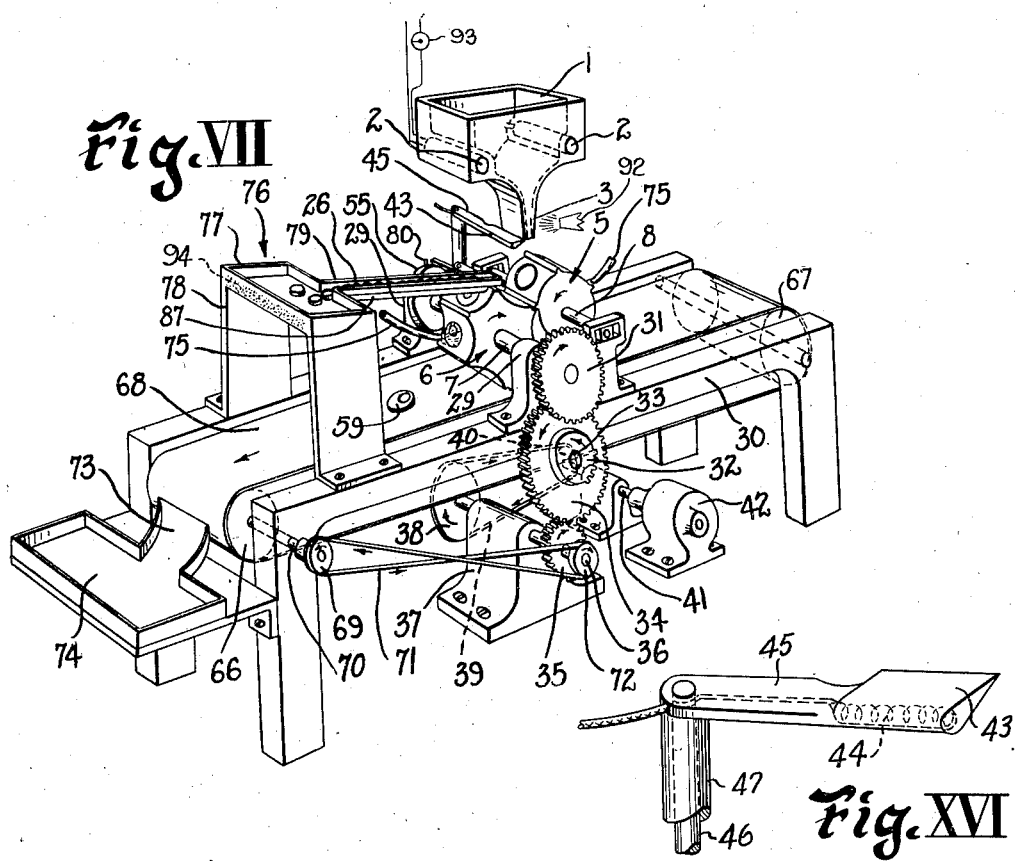
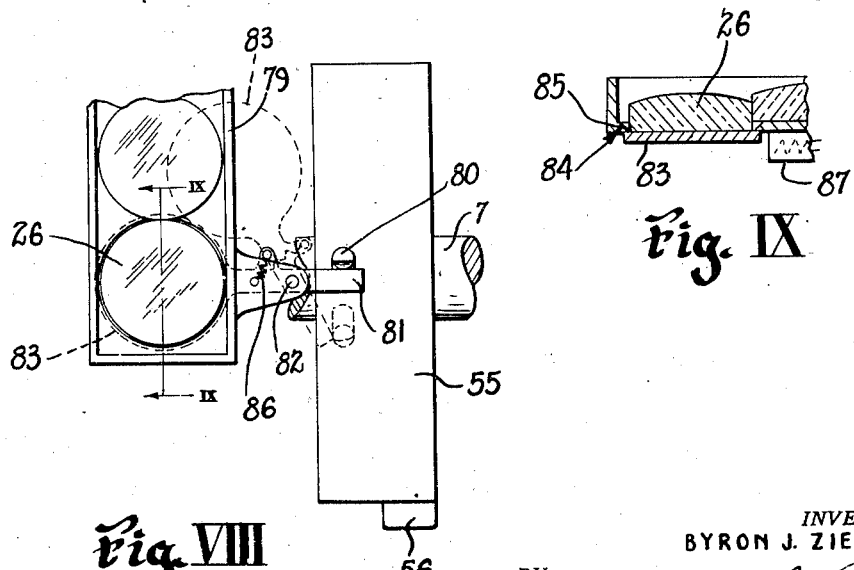

Dec. 23, 1947.     B. J. ZIEGLER     2,433,013
MEANS FOR FORMING LENSES
Filed Dec. 28, 1942     4 Sheets-Sheet 3
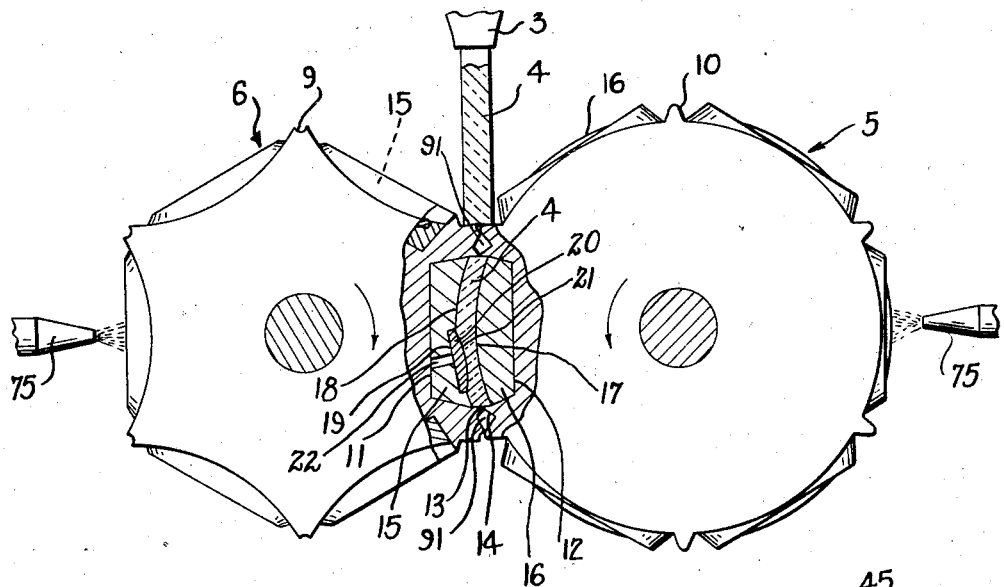
Fig. XII
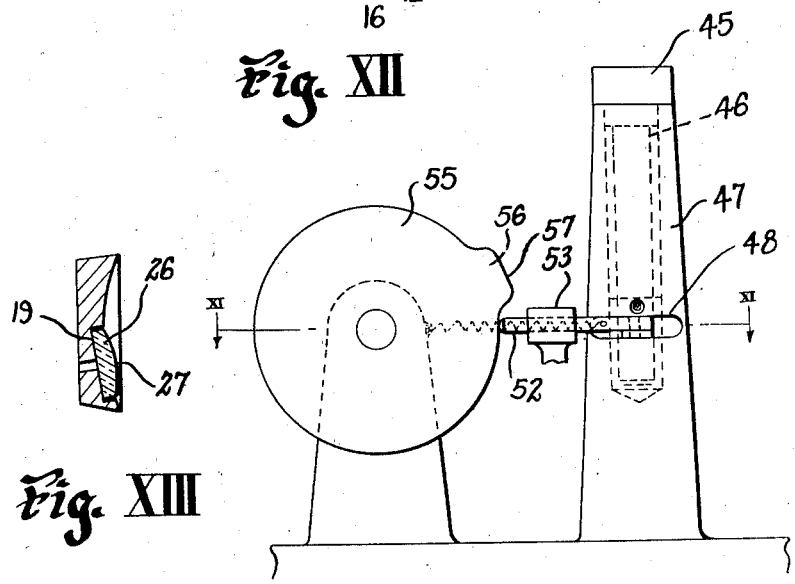
Fig. XIII
Fig. X
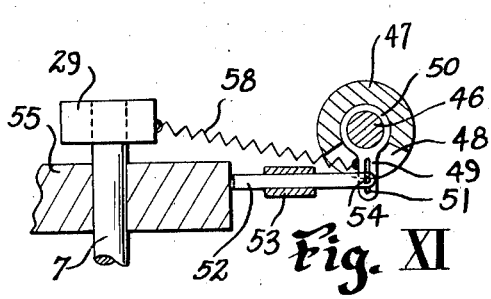
Fig. XI
INVENTOR.
BYRON J. ZIEGLER
BY
ATTORNEY.

Dec. 23, 1947.  B. J. ZIEGLER  2,433,013
MEANS FOR FORMING LENSES
Filed Dec. 28, 1942   4 Sheets-Sheet 4
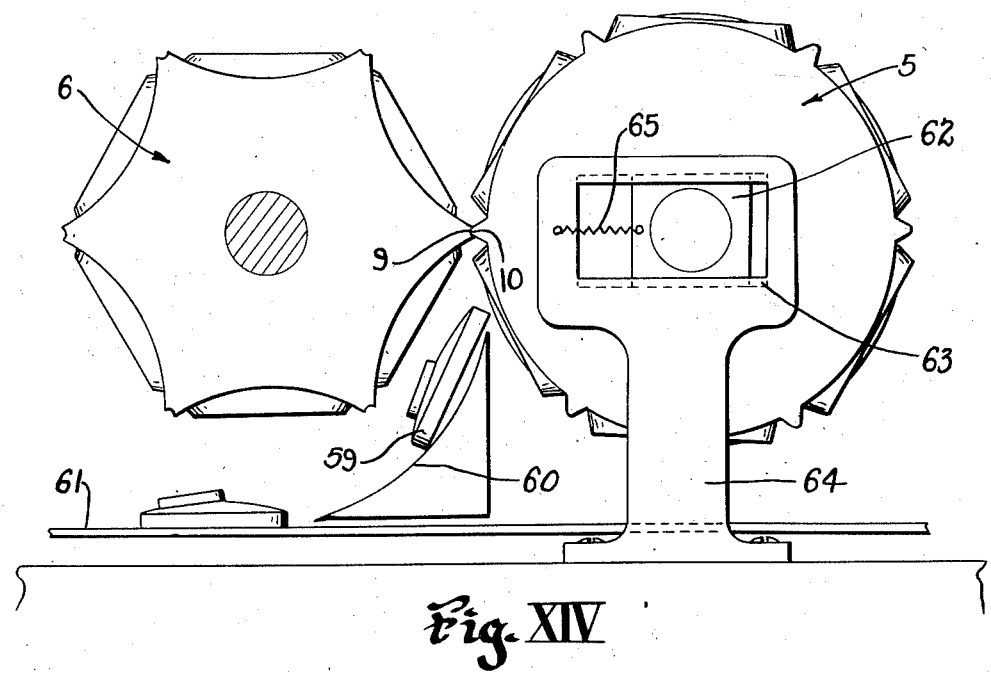
Fig. XIV
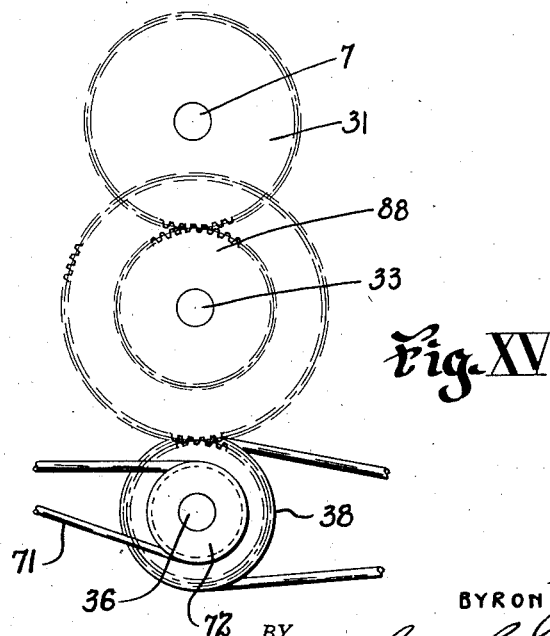
Fig. XV
INVENTOR.
BYRON J. ZIEGLER
BY
ATTORNEY.

Patented Dec. 23, 1947

2,433,013

UNITED STATES PATENT OFFICE 2,433,013

MEANS FOR FORMING LENSES

Byron J. Ziegler, West Dudley, Mass., assignor to American Optical Company, Southbridge, Mass., a voluntary association of Massachusetts Application December 28, 1942, Serial No. 470,347

10 Claims. (Cl. 49—1)

This invention relates to improved means of forming lenses and has particular reference to novel apparatus for producing lens blanks and lenses.

One of the principal objects of the invention is to provide improved apparatus for automatically producing blanks for ophthalmic lenses.

Another object is to provide improved apparatus for forming blanks for single vision lenses.

Another object is to provide improved apparatus for automatically producing a semi-finished blank for a multifocal lens.

Another object is to provide improved apparatus for automatically molding a blank and fusing a segment of glass to said blank to produce a semi-finished blank for multifocal lenses.

Another object is to provide improved apparatus for automatically and successively producing molded blanks having similar dimensional characteristics for use in forming ophthalmic lenses.

Another object is to provide improved apparatus for molding lens blanks for use in forming multifocal lenses wherein minor focal fields resulting in different focal powers may be formed.

Another object is to provide improved apparatus for producing a flow of plastic lens medium and for successively molding portions of said flow into blanks for use in forming single vision or multifocal lenses.

Other objects and advantages of the invention will become apparent from the following description taken in connection with the accompanying drawings and it will be apparent that many changes may be made in the details of construction and arrangement of parts shown and described without departing from the spirit of the invention as expressed in the accompanying claims. I, therefore, do not wish to be limited to the exact details of construction and arrangement of parts shown and described as the preferred forms only have been given by way of illustration.

Referring to the drawings:

Fig. I is a face view of one form of blank resulting from the improved apparatus embodying the invention;

Fig. II is a sectional view taken as on line II—II of Fig. I;

Fig. III is a face view of another form of lens blank resulting from the improved apparatus embodying the invention;

Fig. IV is a sectional view taken as on line IV—IV of Fig. III;

Fig. V is a face view of another form of lens blank resulting from the improved apparatus embodying the invention;

Fig. VI is a sectional view taken as on line VI—VI of Fig. V;

Fig. VII is a perspective view of an improved apparatus embodying the invention and for carrying out the method of said invention;

Fig. VIII is a fragmentary view of a portion of the apparatus illustrated in Fig. VII;

Fig. IX is a fragmentary sectional view taken as on line IX—IX of Fig. VIII;

Fig. X is a fragmentary view of another portion of the apparatus illustrated in Fig. VII;

Fig. XI is a fragmentary sectional view taken as on line XI—XI of Fig. X;

Fig. XII is an enlarged fragmentary view shown partially in section of the molding dies of the apparatus embodying the invention;

Fig. XIII is a fragmentary sectional view of one of the molding dies embodying the invention illustrating a modification;

Fig. XIV is a view generally similar to Fig. XII showing the molding dies in open position for depositing a molded blank and showing a portion of the supporting means for said dies;

Fig. XV is a fragmentary side view of a modified form of gearing for use with the apparatus illustrated in Fig. VII for introducing a continuous rotary movement to the molding dies; and Fig. XVI is a perspective view of the glass severing means illustrated in Fig. VII.

The provision of an apparatus and method of molding lens blanks is not new in the art but such apparatus and methods, as far as is known, were such that only a single lens blank could be molded at a time. The usual practice was to form a plurality of blanks by separating a piece of glass, originally in sheet form, into a plurality of small pieces which were separately heated, placed into a mold and compressed to the shape of said mold. In molding lenses great care has to be taken to avoid having striae therein, particularly striae in the form of wavy lines which are readily visible to the eye.

Another important factor in molding is to avoid having the molded blank adhere to the mold. The present invention, therefore, is directed to a novel apparatus for automatically and successively molding blanks for lenses from heated lens medium flowed into said mold, that is, lens medium which is not originally in sheet form, which has been usual in the past, and by so compressing said flowed material as to avoid the formation of undesirable striae therein and by obviating the possibility of said molding blanks adhering to the mold during said molding operation. Another feature of the present invention is to provide means for simultaneously molding a blank and fusing a segment thereto of a different index of refraction for producing multifocal lenses or for forming blanks with a finished countersink therein for the reception of a piece of lens medium of a different index of refraction to hereinafter be fused therein.

Referring more particularly to the drawings wherein like characters of reference designate like parts throughout the several views, the apparatus embodying the invention comprises a vat or tank 1 having suitable heating units 2 associated therewith for heating lens medium to a plastic state whereby it will flow. The lens medium is adapted to flow outwardly of a nozzle 3 under the action of gravity or pressure. The nozzle 3 may or may not be heated, as required, in order to maintain the lens medium plastic and flowable. The lens medium 4, as illustrated in Fig. XII, is directed downwardly to suitable molding dies 5 and 6. The molding dies 5 and 6 are each provided with spaced engagement means 9 and 10. One of said dies is positively rotated and the other of said dies is adapted to be rotated through the interengaging of the spaced engagement means 9 and 10. The respective dies 5 and 6 are provided, briefly, with spaced recesses 11 and 12 having comating flange like edge portions 13 and 14 functioning as severing means for the lens material being molded. Internally of the recesses 11 and 12 there are supported interchangeable molding elements 15 and 16. The side walls of the recesses, 11 and 12, and the side edges of the molding elements 15 and 16, are tapered so that the said elements will be bindingly held in said recesses. The molding element 16 has a convex surface 17 adapted form the concave side of the blank with its curvature controlled to the curvature desired on said concave side. The molding element 15 has a major concave surface 18 adapted to form the convex side of the blank and is of the curvature desired on said convex side. The molding element 15 also has a recess 19 adapted to support an interchangeable minor molding element 20 having a convex curved surface 21 thereon adapted to form a countersink in the lens medium 4 being molded. The major molding elements 15 and 16 and the minor molding element 20 may be formed of high temperature softening glass or metal or metal alloy. When metal is used, it is selected according to the type of lens medium or glass to be molded and according to the temperatures required to render the lens medium or glass moldable. For example, the metal or composition of metal must be such as to avoid excessive oxidation during the molding operation. The surface 21 of the minor molding element is preferably a highly polished true optical surface so as to mold a desirable finished optical surface in the countersink formed thereby. The minor mold inserts 20 are secured within the recesses 19 so as to be positively held therein during the molding operation. Any suitable retaining arrangement may be used; for example, the said minor molding elements 20 may be frictionally placed into retaining relation with the walls of the recesses 19. The major molding element 15 may be provided with a suitable opening 22 through which a suitable ejecting tool may be inserted to eject the minor molding element 20 from said major molding element. This arrangement is for molding semi-finished blanks having countersinks therein in which a piece of lens medium of a different index of refraction may be later fused. Such a blank is illustrated in Figs. I and II and comprises a major portion 23 having a countersink 24 therein. The blank thus formed is for use in forming multifocal lenses.

If desired, a continuous surface 18 may be formed on the molding elements 15 so as to produce a blank 25 for a single vision lens, such as illustrated in Figs. V and VI. A plurality of molding elements 15 and 16 are arranged in spaced relation with each other through the periphery of the molding dies 5 and 6 and the said elements are adapted to be moved into alignment with each other through the interengaging of the engagement means 9 and 10, as illustrated in Fig. XII.

Instead of placing minor mold inserts 20 inwardly of the recesses 19, segments of glass 26 of a higher index of refraction than the lens medium 4 may be loosely placed in said recesses 19, as illustrated in Fig. XIII. In this instance, the segments 26 are provided with a curved optical surface 27 which is adapted to form the countersink in the major piece of lens medium 4 during the molding thereof and is adapted to be simultaneously fused in said countersink so as to produce a blank 28 such as illustrated in Figs. III and IV.

It is to be understood that the temperatures and softening points of the lens mediums for the major blank and segment portion 26 must be carefully controlled in order to accomplish the results desired.

Referring again to the apparatus illustrated in Fig. VII, the shaft 7, carrying the molding die 6, is journalled within spaced bearings 29 mounted on a frame 30. The shaft 7 carries a gear 31 which is adapted to be intermittently engaged by a gear sector 32. The gear sector 32 is mounted on a shaft 33 journalled to the main frame 30. Also on the shaft 33 there is supported a gear 34 in constant mesh with a gear 35 carried by a shaft 36. The shaft 36 is journalled within a suitable bearing 37. The shaft 36 is driven by a pulley 38 connected by a belt 39 to a pulley 40 mounted on a shaft 41 driven by a motor 42 or other suitable source of power. As the gear 35 is rotated by the belt and pulley connection with the motor 42, the said gear simultaneously rotates the gear 34. The gear 34, in turn, rotates the gear sector 32 which intermittently meshes with the gear 31 so as to intermittently rotate said gear 31 a controlled amount this amount being sufficient to rotate a set of molding elements 15 and 16 into alignment with each other as illustrated in Fig. XII. This is brought about through the intermittent rotation of the die 6 by the gear 31 and through the engagement of the interengaging means 9 and 10 on the respective dies 5 and 6. As the dies 5 and 6 are intermittently rotated, a desired amount of plastic lens medium 4 flows outwardly of the vat or tank 1 down between the molding faces of the molding elements 15 and 16, with the interengaging means 9 and 10 forming a closed base to limit the downward flow thereof, as illustrated in Fig. XII. A suitable severing blade 43 is adapted to sever the lens medium adjacent the end of the nozzle 3 and serves to retard the flow of the lens medium simultaneously to said severing. The piece of severed lens medium 4 is then free to be picked up by the molding dies 5 and 6 during the intermittent movement thereof to align the molding elements 15 and 16 with each other as shown in Fig. XII. The movement of the molding elements 15 and 16 into alignment with each other simultaneously compresses the lens medium 4 between the surfaces 17 and 18 of the molding dies 15 and 16 and also moves the severing members 13 and 14 into engagement with each other. This cuts away the excess amount of lens medium and forms the blank to a given contour shape and size. The distance between the molding surfaces 17 and 18 automatically reduces the blank to the desired thickness. In instances when only a single vision blank, such as illustrated at 25 in Figs. V and VI, is desired, the molding surfaces 17 and 18 are continuous surfaces. When it is desired to mold a blank, such as illustrated in Figs. I and II with a countersink 24 therein, mold inserts 20 are used. When it is desired to form a blank, such as illustrated in Figs. III and IV, a segment of glass 26 of a higher index of refraction than the lens medium 4 having a curved surface 27 thereon of the curvature desired of the interface between the major and minor portion of the lens, is placed in the recess 19 and simultaneously forms an interface and fuses thereto during the molding of the blank.

The blade 43, as shown in Fig. XVI, preferably contains a heating unit 44 to maintain the blade at a desired temperature. The blade 43, as illustrated in Figs. VII and XVI, has a shank portion 45 mounted on a spindle 46 pivotally supported in an upright 47. The upright 47, Fig. XI, has a cut away portion 48 in the side wall through which a lever 49 carried by a collar 50 is mounted on said spindle 46. The lever 49 has a longitudinal slot 51 therein. A plunger 52 mounted in the bearing 53 has an end pivotally attached at 54 to the lever 49.

On the shaft 7 there is mounted a cam member 55. This cam member has a riser 56 adapted to engage the plunger 52 to move the said plunger longitudinally of the bearing 53 and simultaneously rock the spindle 46 in the upright 47. Due to the fact that the blade 43 is mounted on said spindle, said blade will simultaneously move with the spindle as a unit. This movement of the spindle causes the blade 43 to be moved in a direction transversely of the nozzle 3 thereby causing the said blade to sever the lens medium 4 protruding from said nozzle. The riser 56 on the cam 55 is so located as to sever the material 4 just after the gear sector 32 meshes with the gear 31 or just at the start of the intermittent advancing of the molding die 6. After the blade 43 has been advanced by the riser 56 of the cam 55 the blade is held in position over the open end of the nozzle 3 by a dwell area 57 formed on said riser. This checks the flow of the material 4 during the intermittent advancing of the dies 5 and 6. A spring 58 connected at one end to the lever 49 and at its opposite end to the bearing 29 is adapted to impart a return movement of the plunger 52 longitudinally of the bearing 53 after the riser 56 has cleared said plunger 52. This spring constantly retains the plunger 52 in engagement with the cam 55.

The centers of the molding dies 5 and 6, during the intermittent advancing thereof, are adapted to be spread apart thereby causing the molding elements 15 and 16 to likewise spread apart and permit the molded blank 59, as illustrated in Fig. XIV, to drop under the action of gravity from said molding elements. The said molded blank is adapted to engage an incline 60 by which it is guided onto an endless conveyor 61. This spreading apart of the molding elements 15 and 16 also allows another gob of lens medium to be positioned between the succeeding pair of dies.

The pivotal centers of the molding dies 5 and 6 are movable to different spaced relations with each other through the provision of slide blocks 62 in which the shaft 8 of the die 5 is rotatably supported, the said slide blocks being slidably supported in the slideway 63 located in the uprights 64 carried by the main frame 30. Springs 65, connected to the slide blocks 62 and the uprights 64 at the opposed ends thereof, normally urge the molding dies 5 and 6, that is, the engaging elements 9 and 10 thereof, into constant interfitting engagement with each other. These engagement elements 9 and 10, through the positive rotation of the die 6, are adapted to impart the spreading action to the pivotal centers of said molding dies and simultaneously cause the molding elements 14 and 15 to spread outwardly relative to each other. This movement is a relatively straight line movement resulting from the movement of the slide block 62 in the slideway 63.

The endless conveyor 61 comprises a pair of rollers 66 and 67 mounted adjacent the opposite ends of the main frame 30. An endless belt-like member 68 is mounted on said rollers 66 and 67. The roller 66 has a pulley 69 mounted on the spindle 70 by which it is pivotally supported on the main frame 30. The pulley 69 is connected by a belt 71 to a pulley 72 mounted on the shaft 36. This imparts a continuous movement to the belt-like member 68 of the endless conveyor. The blanks 59 are adapted to fall through the action of gravity down an incline 73 into a suitable receptacle 74.

In order to prevent the molding dies from becoming excessively heated by the plastic material 4 being molded and in order to prevent the said material from adhering to the surfaces of the molding elements 15 and 16 during said molding, jets 75 are supported in alignment with the molding elements 15 and 16 for directing a blast of cold air or liquid onto said molding elements. These jets are adapted to maintain the temperature of the molds sufficiently low so as to avoid undesirable adhering of the material 4 with said molds during the molding operation, and yet high enough to prevent breakage.

When it is desired to fuse a segment 26 of a higher index of refraction to the blank simultaneously to the molding thereof, a hopper 76 is supported above the molding die 6; see Figs. VII, VIII and IX. The hopper 76 comprises a tray-like member 77 carried by uprights 78 mounted on the main frame 30. An inclined trough-like member 79 extends downwardly from said tray 77 toward the molding die 6. This trough-like member 79 has a plurality of segments 26 loosely held therein. The said segments 26 are adapted to move downwardly of the trough-like member 79 under the action of gravity. As the molding die 6 is rotated the cam member 55 mounted on the shaft 7 carrying said die 6 is simultaneously rotated. The cam-like member 55 is provided with a protrusion 80 which is adapted to engage a lever 81 pivotally attached at 82 to the side of the trough-like member 79. The lever 81 has a baffle plate 83 mounted on its end opposite the end adapted to engage the protrusion 80. The baffle plate 83 normally lies beneath an opening 84 formed in the end of the trough-like member 79 overlying the molding die 6. This baffle plate 83, as illustrated by dash lines in Fig. VIII, is adapted to be moved sidewise through the engagement of the protrusion 80 with the lever 81 to allow a segment 26 to drop into an aligned recess 19 of the molding element 15. The recess and segment are so dimensioned that the said segment loosely fits in said recess. The opening 84 is provided with inclined side walls 85 which automatically locate the segment 26 in superimposed relation with the baffle plate 83. After a segment 26 has been allowed to drop within an aligned recess 19, a spring 86 is adapted to return the baffle plate 83 into aligned relation with the recess 84. The action of the segments sliding down the inclined troughs 79 automatically moves another segment into alignment with the openings 84. It is to be borne in mind that the protrusion 80 moves clear of the lever 81 so as to permit the spring 86 to function. The glass segments 26, in order to enable the simultaneous feeding thereof to the molding, are preferably heated to a controlled temperature. This is brought about through the provision of a heating unit 87 located beneath the trough 79 and extending longitudinally thereof. This heating unit may be an electrically operated unit or the like.

It is to be understood that the operation of the molding dies 5 and 6, blade moving mechanism, and segment depositing means is so timed as to have the said elements operate at the desired time.

Instead of employing a severing blade 43 it might be desirable to allow a continuous flow of material to be directed between the molding dies 5 and 6 and to impart a continuous rotary movement to said molding dies. This may be brought about through the use of a gear 88 as illustrated in Fig. XV, in constant mesh with the gear 31. In this instance, the engaging elements 9 and 10 would function as means for severing the lens material. In this instance, of course, the speed of flow of the material and the speed of rotation of the dies 5 and 6 is controlled so as to enable an ample amount of material to continually flow in between the said dies.

In instances when it is desired to simultaneously mold and fuse a segment in a blade, the lens mediums for the respective portions of said blank are carefully selected as to their respective softening points, indices of refraction, and coefficients of expansion so that the curved surfaces on the said segments will function as means for forming a curved interface between the joined major portion and segment of lens mediums, that is, so that the said segment will first embed itself within the lens material 4 to the major portion of the blank prior to having its contiguous surface become softened sufficiently to bring about fusion of the segment to the major portion of the blank.

Because of the fact that the dies move toward each other along a relatively straight line, no undesirable striae will exist in the molded blank. These striae result primarily from the cooling of the glass in different layers at different times. This cooling of different layers at different times causes said layers to have different indices of refraction thereby causing visible lines. If striae should exist and extend in a horizontal layer, they will be practically unnoticeable and will not be sufficiently injurious as to cause a rejection of the lens. If, however, the striae are wavy it might be objectionable. Due to the fact, that the dies are moved towards each other along a relatively straight line, any striae which might exist would extend in horizontal layers and therefore would be negligible.

It has been stated that care must be taken that the temperature of the molding elements be controlled. The controlling of this temperature must be such as to avoid having the glass or lens medium adhere thereto during the molding of the blank, that is, it must not be too high as the glass will adhere to the molding elements. If too low, it will introduce striae or cracks in the blank. The temperature, therefore, must be controlled so as to obviate these difficulties. The proper temperature can be arrived at by trial or experimentation and is varied according to the temperature of the plastic glass or lens medium which is flowed into the molding elements. The temperature of the glass flowing into the molding elements is controlled by the heating units 2 or the like. It is also to be understood that heat may be applied to the nozzle 3, if desired, through the provision of a suitable torch flame 92 or the like. The temperature of the heating units 2 may be controlled, if electrically operated, through the use of a suitable rheostat 93 or the like. The temperature of the molding elements is controlled through the provision of suitable cooling jets 75 as set forth above or may be controlled by any other suitable means.

The temperature of the segments 26 is controlled by the heating unit 87 or the like. It might also be desirable to provide the tray 77 with a suitable hot plate brought about through the use of a suitable electrical coil or the like 94 which will heat the segments to a temperature which, after the said segments have moved downwardly of the trough-like member 79, and are deposited in the recesses 19, the molding dies 15 will be of a proper temperature to avoid cracks and/or distortion.

It is also to be understood that the ratio of the gearing is controlled in order to attain the results desired.

It is to be understood that the various parts of the apparatus are shown only by way of illustration and that any other arrangement might be used for accomplishing the results desired.

With the arrangement illustrated in Fig. VII glass of the desired index of refraction for use in forming the major portion of the blanks to be molded is deposited in the vat or tank 1. It is heated to a temperature whereby a continuous flow of said glass or lens medium may be flowed outwardly of the nozzle 3 into the molding dies 5 and 6. When a desired amount of material is flowed outwardly of the nozzle 3, the gearing for operating the molds is so timed as to cause the gear sector 32 to mesh with the gear 31 thereby imparting a rotary movement to the molding dies 5 and 6. Simultaneous to the imparting of a rotary movement to the die 6, the cam member 55 operates the severing blade 43 causing the lens medium or glass protruding from the nozzle 3 to be severed and the molding elements 15 and 16 to be simultaneously moved into compressed relation with said material so as to cause the said material to assume the shape of the surfaces 17 and 18 and to cause any excess material to be cut away by the severing means or edges 13 and 14. It is to be understood, of course, that molding elements having the desired surface curvatures 17 and 18 thereon have been previously positioned within the molding dies 5 and 6. If a single vision blank is to be molded, said surfaces 17 and 18 are continuous. If blanks having a countersink therein are to be molded, molding elements 15 having minor molding means 20 therein for the countersink are placed in the molding die 6. Due to the fact that the gear sector 32 does not continuously intermesh with the gear 31 the dies 5 and 6 are adapted to dwell for a given period of time when in aligned compressed relation with the lens medium 4 being molded. This allows the lens medium or glass 4 to set to the shape of the molding surfaces 17 and 18 prior to their being deposited from said molding elements. The next successive intermeshing of the gear sector 32 with the gear 31 causes the molding dies 5 and 6 to be simultaneously rotated. The contacting of the engagement means 9 and 10 during said rotation of the molding dies causes the said die 5 to be moved sidewise in a relatively straight line thereby relieving pressure on the molded blank immediately upon the movement of said dies, thereby allowing the blank to follow under the action of gravity down the incline 60 and onto the endless conveyor 61. Simultaneous to the movement of the dies 5, the next successive deposit of molten or plastic glass between these advancing molding elements 15 and 16 is compressed to the shape of said dies. The thickness of the blank is controlled by the spacing of the surfaces 17 and 18 from each other. In instances when it is desired to fuse a segment 26 to the molded blank the cam member 55 having a protrusion 80 thereon is arranged to engage the lever 81 of a baffle plate 83 associated with a suitable hopper 76 for automatically directing said blanks toward the molding die 6. In this instance, the molding elements 15 each having a recess 19 therein are used and the segments 26 are successively deposited in said recesses during the intermittent rotation of the molding dies 5 and 6. As stated above, the segments 26 are heated to a controlled temperature to insure proper fusion with the lens medium 4 during the molding thereof and to insure the forming of a proper optical interface 21 between the joined pieces of lens medium. It is to be understood, of course, that the indices of refraction of the lens mediums are selected as well as the coefficients of expansion of said lens mediums as to bring about the proper results. The coefficients of expansion of the lens mediums are selected so as to be substantially the same so that the segments will remain in proper fused relation with the major portion of the blanks. Due to the fact that the segments 26 fit loosely within the recesses 19 of the molding elements 15 the said finished blank and joined segment is free to follow under the action of gravity of the molding dies. In instances when it is desired to utilize a continuous flow of glass, the molding dies 5 and 6 are continuously rotated through the use of a gearing arrangement such as illustrated in Fig. XV. It might be desirable to direct heat to the portion of lens medium protruding from the nozzle 3. This could be accomplished by directing a flame onto said material while in suspension.

The severing blade 43 is preferably provided with a heating unit 44 so as to avoid undesirable chilling of the plastic lens medium when severing the same.

As previously stated above, the molding elements may be formed of high melting glass or of suitable metal compositions. Such compositions embody the use of mixtures of nickel and tin, or high chrome silicon iron. The minor molding elements 20, as well as the major molding elements 15 and 16 might also be formed of speculum metal. If it is desired to use glass molds any high temperature softening glass or glass having a much higher softening point than the glass to be molded might also be used, such as Pyrex glass. Fused quartz may also be used.

After the blanks have been molded the opposed sides thereof are ground and polished with desired optical surfaces, such as illustrated by the dot and dash lines 89 and 90 in Figs. IV and VI. These surfaces are the usual optical surfaces employed in forming ophthalmic or other lenses and are combined as to curvatures so as to produce the resultant power desired of the lens.

When molding blanks, as illustrated in Fig. XII, the excess material may flow into the space 91 surrounding the molding elements 15 and 16. Because of the fact that severing means 13 and 14 are provided this excess material will be severed from the main blank during the molding operation.

Although the molding element 15 has been described as being provided with a recess 19 for the reception of minor molding elements 20 or segments 26, it is to be understood that the said segments may be placed in a suitable similar recess provided in the molding elements 16. It is also to be understood that the temperature to which the segments 26 are heated is controlled according to the temperature of the lens medium used in molding the major blank so as to insure that proper heating can be arrived at by trial and experimentation, so that the temperature of the segments will vary with the temperatures of the glass or lens medium 4 used in molding the major portion. If desired, a device similar to that shown and described by applicant, might be used only for fusing segments to major lens blanks, that is, a rotary member similar to the molding die 5 might be provided with spaced portions on its periphery with means for supporting lens blanks which have been previously shaped either with or without a countersink therein and a rotary member simulating the molding die 6 might be provided on its periphery with means for supporting segments to be molded with said major blanks. In this instance, the blanks and/or segments would be preshaped, heated while supported on the rotary elements and then moved into assembled relation with each other. The blanks and segments could be fed onto the rotary elements by a suitable hopper simulating the hopper 79. The supporting portions of the respective rotary elements might be initially positioned internally of suitable heating furnaces and the parts to be fused together could be rotated outwardly of said furnaces into assembled relation with each other. This, of course, would be purely a fusing problem.

It is also to be understood that one or more of said segments might be supported for fusion with the major blank or a segment formed of one or more pieces of glass of different indices of refraction might be supported for automatic fusion either with the simultaneous molding of the blank or with a preformed blank.

It is to be understood that the countersink, as shown in Figs. II and IV, may be formed on either the concave or convex side of the blank as desired.

From the foregoing description, it will be seen that simple, efficient and economical means have been provided for accomplishing all of the objects and advantages of the invention.

Having described my invention I claim:

1. In a device of the character described for forming lens blanks the combination of a pair of molding dies each having a plurality of molding elements thereon, said dies being rotatably supported for movement of the molding elements thereof by pairs into comating relation with each other, with said dies, during the rotation thereof, having portions engaging each other below the next progressively comating pair of molding elements for providing a closed base below said elements, one of said elements having a surface thereon of the shape desired to be formed on one side of the blank and the other of said elements having a surface thereon of the shape desired to be formed on the opposed side of the blank, means for rotating said dies to bring said pairs of molding elements into proper comating relation with each other and means for simultaneously feeding lens medium in between said elements during the rotation thereof, said molding elements having their surfaces in controlled spaced relation with each other and being adapted to control the resultant thickness of the blank formed thereby.

2. In a device of the character described for forming lens blanks the combination of a pair of molding dies each having a plurality of molding elements thereon rotatably alignable in comating relation with each other, said elements being in pairs with one element of each pair having a surface thereon of the shape desired to be formed on one side of the blank and the other element of each pair having a surface thereon of the shape desired to be formed on the opposed side of the blank, means for positively rotating one of said molding dies, interengaging means on said molding dies which during the positive rotation of one die will cause the other die to be rotated and simultaneously move the molding elements into proper comating relation with each other and means for simultaneously feeding lens medium in between said elements during the rotation thereof, said molding elements having their surfaces in controlled spaced relation with each other and being adapted to control the resultant thickness of the blank formed thereby.

3. In a device of the character described for forming lens blanks the combination of a pair of molding dies each having a molding element thereon, said dies being rotatably supported for rotative movement of the molding elements thereof into comating relation with each other with one of said dies being movable away from the other die through direct engagement of portions of said dies, means normally urging said dies toward each other to cause said engaging portions to remain in engagement, one of said elements having a surface thereon of the shape desired to be formed on one side of the blank and the other of said elements having a surface thereon of the shape desired to be formed on the opposed side of the blank, means for rotating said dies to bring said molding elements into proper comating relation with each other and means for simultaneously feeding lens medium in between said elements during the rotation thereof to form a major blank the surface of one of said molding elements having a recess adapted to receive a segment of another lens medium to which the lens medium for the major blank is molded during the forming of the said major blank.

4. In a device of the character described for forming lens blanks the combination of a pair of rotatably supported molding dies each having a plurality of molding elements thereon rotatably alignable in comating relation with each other, said elements being in pairs with one element of each pair having a surface thereon of the shape desired to be formed on one side of the blank and the other element of each pair having a surface thereon of the shape desired to be formed on the opposed side of the blank, means for rotating the dies to move said molding elements into proper comating relation with each other with the center of one of said dies being movable away from the center of the other die, resilient means normally urging said dies toward each other and means for simultaneously feeding lens medium in between said elements during the rotation thereof to form a major blank, the surface of one of each of said pairs of elements having a recess therein adapted to receive a segment of another lens medium about which the lens medium for the blank proper is molded during the forming of said blank.

5. In a device of the character described for forming lens blanks the combination of a pair of rotatable dies, each having molding elements shaped to the form of shape of blank desired, means for rotating one of said molding dies, means on said other die directly engaging the rotated die to cause said dies to be simultaneously rotated to position the molding elements in aligned comating relation with each other successively and progressively, means for simultaneously feeding lens medium in plastic state between said molding elements, means adjacent said directly engaging means and associated with said molding elements for severing and shaping the contour of the lens medium between said dies to a given shape during the molding of said lens medium to the surface shapes desired.

6. In a device of the character described for forming lens blanks the combination of a pair of rotatable dies, each having molding elements shaped to the form of shape of blank desired, means for rotating one of said molding dies, means on said other die directly engaging the rotated die to cause said dies to be simultaneously rotated to position the molding elements in aligned comating relation with each other successively and progressively, means for simultaneously feeding lens medium in plastic state between said molding elements, means adjacent said directly engaging means and associated with said molding elements for severing and shaping the contour of the lens medium between said dies to a given shape during the molding of said lens medium to the surface shapes desired, said molding elements being positioned in controlled spaced relation with each other when in comating relation to control the resultant thickness of the molded blank.

7. In a device of the character described for forming lens blanks the combination of a pair of rotatable dies, each having molding elements shaped to the form or shape of blank desired, means for rotating one of said molding dies, means on said other die directly engaging the rotated die to cause said dies to be simultaneously rotated to position the molding elements in aligned comating relation with each other successively and progressively, means for simultaneously feeding lens medium in plastic state between said molding elements, means adjacent said directly engaging means and associated with said molding elements for severing and shaping the contour of the lens medium between said dies to a given shape during the molding of said lens medium to the surface shapes desired, the continued rotary movement of said dies being adapted to successively align suitable pairs of molding elements with each other and being adapted to successively mold the lens medium into lens blanks with said blanks being adapted to drop under gravital action from between the molding elements when moved from comating relation with each other and means for receiving said molded blanks.

8. In a device of the character described for forming lens blanks, the combination of a pair of molding dies each having a molding element thereon, said dies each being rotatably supported with at least one of said dies embodying slide means permitting said die to be moved in a direction away from the other die and embodying means for causing said die to move toward said other die during the rotation of said dies for moving the molding elements thereof into comating relation with each other, one of said molding elements having a surface thereon of a shape to be formed on one side of the blank and the other of said elements having a surface thereon of the shape desired to be formed on the opposed side of the blank, means for rotating said dies, means for simultaneously causing at least one of said dies to move in a direction away from and toward the other of said dies to affect the proper comating of said elements and means for simultaneously feeding lens medium in between said elements during said rotation.

9. In a device of the character described for forming lens blanks, the combination of a pair of molding dies each having a plurality of molding elements thereon, said dies each being rotatably supported with at least one of said dies embodying slide means permitting said die to be moved in a direction away from the other die and embodying means for causing said die to move toward said other die during the rotation of said dies for moving the molding elements thereof into comating relation with each other, one of said molding elements having a surface thereon of a shape to be formed on one side of the blank and the other of said elements having a surface thereon of the shape desired to be formed on the opposed side of the blank, means for rotating said dies, means for simultaneously causing at least one of said dies to move in a direction away from and toward the other of said dies to affect the proper comating of said elements and means for simultaneously feeding lens medium in between said elements during said rotation.

10. In a device of the character described for forming lens blanks, the combination of a pair of molding dies each having a plurality of interchangeable molding elements thereon, said dies each being rotatably supported with at least one of said dies embodying slide means permitting said die to be moved in a direction away from the other die and embodying means for causing said die to move toward said other die during the rotation of said dies for moving the molding elements thereof into comating relation with each other, one of said molding elements having a surface thereon of a shape to be formed on one side of the blank and the other of said elements having a surface thereon of the shape desired to be formed on the opposed side of the blank, means for rotating said dies, means for simultaneously causing at least one of said dies to move in a direction away from and toward the other of said dies successively and progressively to affect the proper comating of said elements and means for simultaneously feeding lens medium in between said elements during said rotation.

BYRON J. ZIEGLER.

REFERENCES CITED

The following references are of record in the file of this patent:

UNITED STATES PATENTS

| Number | Name | Date |
| --- | --- | --- |
| 2,291,127 | Wilson | July 28, 1942 |
| 2,023,781 | Cramer | Dec. 10, 1935 |
| 2,026,606 | Bausch | Jan. 7, 1936 |